United States Patent [19]

Sowles et al.

[11] Patent Number: 5,659,545
[45] Date of Patent: Aug. 19, 1997

[54] APPARATUS FOR MOBILE UNIT ACQUISITION IN A SATELLITE COMMUNICATION SYSTEM AND METHOD THEREFOR

[75] Inventors: Kenneth L. Sowles, Chandler; Ralph C. Gregg, Tempe; Keith A. Olds, Mesa, all of Ariz.

[73] Assignee: Motorola, Inc., Schaumburg, Ill.

[21] Appl. No.: 339,998

[22] Filed: Nov. 15, 1994

[51] Int. Cl.[6] .................................................. H04J 4/00
[52] U.S. Cl. .................. 370/324; 370/350; 370/508; 370/519; 375/268; 375/298; 375/362
[58] Field of Search .................................... 375/358, 354, 375/362, 355, 268, 298, 356, 357; 370/324, 350, 501, 508, 509, 519, 516

[56] References Cited

U.S. PATENT DOCUMENTS

| | | | |
|---|---|---|---|
| 3,562,432 | 2/1971 | Gabbard | 179/15 |
| 3,730,998 | 5/1973 | Schmidt et al. | 179/15 BS |
| 3,787,634 | 1/1974 | Haberle et al. | 179/15 BS |
| 3,812,430 | 5/1974 | Schmidt et al. | 325/4 |
| 3,813,496 | 5/1974 | Maillet | 179/15 BS |
| 3,843,843 | 10/1974 | Solomon et al. | 179/15 BS |
| 3,858,007 | 12/1974 | Ganssmantel | 325/4 |
| 3,982,075 | 9/1976 | Jefferis et al. | 179/15 BS |
| 4,054,753 | 10/1977 | Kaul et al. | 179/15 BS |
| 4,107,608 | 8/1978 | Saburi | 325/4 |
| 4,168,398 | 9/1979 | Matsuo et al. | 178/69.1 |
| 4,215,239 | 7/1980 | Gordy et al. | 375/114 |
| 4,555,782 | 11/1985 | Alaria et al. | 370/104 |
| 4,561,099 | 12/1985 | Atsugi | 375/97 |
| 4,652,834 | 3/1987 | McAdam | 329/50 |
| 4,686,673 | 8/1987 | Hotta | 370/104 |
| 4,688,217 | 8/1987 | Ishi et al. | 370/104 |
| 4,726,040 | 2/1988 | Acampora | 375/75 |
| 4,941,155 | 7/1990 | Chuang et al. | 375/84 |
| 5,072,445 | 12/1991 | Nawata | 370/104.1 |
| 5,177,740 | 1/1993 | Toy et al. | 370/105.1 |
| 5,343,497 | 8/1994 | Canosi et al. | 375/11 |
| 5,363,373 | 11/1994 | Nakahara et al. | 370/104.1 |
| 5,469,467 | 11/1995 | Vella-Colerio | 375/358 |
| 5,479,409 | 12/1995 | Dupuy et al. | 370/95.3 |
| 5,509,035 | 4/1996 | Teidemann | 375/356 |
| 5,510,797 | 4/1996 | Abraham et al. | 342/352 |
| 5,519,710 | 5/1996 | Otsuka | 370/95.3 |

OTHER PUBLICATIONS

"Modern Science & Technology of Telecommunications", Nov. 1991, No. 142, Scientific & Technical Information Center of MPT of China, Item 6, p. 4; item 7, pp. 4–5.

Primary Examiner—Wellington Chin
Assistant Examiner—Jean B. Corrielus
Attorney, Agent, or Firm—Gregory J. Gorrie

[57] ABSTRACT

To obtain service from a satellite communication system, a mobile subscriber unit must acquire a TDMA communication channel. Because the satellites move with respect to the surface of the earth, propagation delays and Doppler shift affect the timing and frequency of received signals. A mobile subscriber unit synchronizes to the frequency and timing windows of a satellite communication station by receiving frequency and timing corrections during channel acquisition. The satellite initially estimates correction factors during initial acquisition requests and further estimates correction factors from synchronization bursts from the subscriber unit.

23 Claims, 7 Drawing Sheets

APPARATUS FOR MOBILE UNIT ACQUISITION IN A SATELLITE COMMUNICATION SYSTEM AND METHOD THEREFOR

CROSS REFERENCE TO RELATED APPLICATIONS

This application is related to the following U.S. Pat. Nos. 5,383,225 entitled "SYNCHRONIZER FOR TDMA ACQUISITION SIGNAL HAVING AN UNKNOWN FREQUENCY"; 5,552,795 entitled "LOCATION DETERMINATION METHOD AND SYSTEM USING MULTI-BEAM SATELLITES"; 5,463,400 entitled "METHOD AND APPARATUS FOR SYNCHRONIZING TO A MULTI-BEAM SATELLITE TDMA COMMUNICATION SYSTEM"; 5,515,062 entitled "LOCATION SYSTEM AND METHOD WITH ACQUISITION OF ACCURATE LOCATION PARAMETERS"; 5,490,087 entitled "RADIO CHANNEL ACCESS CONTROL"; and 5,367,304, entitled "COMMUNICATION SYSTEM EMPLOYING SPECTRUM REUSE ON A SPHERICAL SURFACE". All patents listed above are assigned to the same assignee as the present application.

TECHNICAL FIELD OF THE INVENTION

This invention relates in general to the field of Time Division Multiple Access (TDMA) communication systems. More specifically, the present invention relates to satellite communication systems where mobile subscriber units synchronize to TDMA communication channels.

BACKGROUND OF THE INVENTION

In communication systems having mobile subscriber units, the first step in obtaining service from the communication system is acquisition. Acquisition is the process of establishing a communication link between a communication station and a subscriber unit. Acquisition is necessary for registration of the subscriber unit, call set-up, answering call terminations, or to initiate services with a communication system.

In satellite communication systems using Time Division Multiple Access (TDMA) frequency channels, subscriber units must communicate at a proper frequency channel and time-slot. Failure to do so will result in interference with ongoing calls in adjacent time-slots and frequency channels and a loss of information.

In satellite-based communication systems where the communication stations are moving rapidly with respect to the subscriber units, the subscriber units must compensate for a wide range of propagation delays associated with the distance to a satellite from different points within the satellite's footprint. The subscriber units must also compensate for the frequency shift associated with the velocity of the satellite. This is especially true in satellite systems having low-earth orbits.

The use of random access channels is complicated by the geometry of a satellite system. The conventional method of collision avoidance on random access channels by carrier sensing is not effective in a satellite system because the subscriber units are often not in a radio line-of-sight of each other. Messages may be blocked by two or more subscriber units attempting to transmit to a satellite on the same channel at the same time.

The use of control channels in a mobile satellite system is also impaired because satellite channels are subject to momentary outages due to fading and blockage. These outages could cause the loss of important control messages and prevent completion of the acquisition process.

Thus what is needed are a method and apparatus for acquiring a traffic channel of a satellite communication system. What is also needed are a method and apparatus for synchronizing to a communication system's timing windows where the distances to the subscriber units are unknown. Further, what is also needed is a subscriber unit that sends signals in sync with the satellite's timing windows. What is also needed is a subscriber unit that corrects the frequency and timing of its transmitted signals to compensate for the velocity of a satellite. Further, what is also needed are a method and apparatus of communicating with a TDMA communication system without interfering with ongoing calls in adjacent time-slots and adjacent frequency channels. What is needed are a method and apparatus that achieve proper frame timing alignment, determine the correct downlink time-slot and correct for the Doppler-shift associated with satellite movement. What is also needed are a method and apparatus that perform these functions reliably in the presence of channel impairment such as multi-path fading or shadowing by obstructions. What is also needed are a method and apparatus that reduce collisions on acquisition channels of a communication system.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

DETAILED DESCRIPTION OF THE INVENTION

The present invention provides, among other things, a method and an apparatus that achieves proper frame timing alignment, determines the correct downlink time-slot and corrects for the Doppler-shift associated with satellite and subscriber unit movement. This enables a subscriber unit to communicate with a satellite communication station over a TDMA frequency channel without interfering with adjacent time-slots of the same frequency channel, and without interfering with different frequency channels.

A "satellite" is defined herein to mean a man-made object or vehicle intended to orbit earth and includes both geostationary and orbiting satellites and/or combinations thereof including low-earth orbiting (LEO) satellites. A "constellation" is defined herein to mean an ensemble of satellites arranged in orbits for providing specified coverage (e.g., radio communication, photogrammetry, etc.) of portion(s) or all of earth. A constellation typically includes multiple rings (or planes) of satellites and may have equal numbers of satellites in each plane, although this is not essential. As used herein the terms "cell" and "antenna beam" are not intended to be limited to any particular mode of generation and include those created by either terrestrial or satellite cellular communications systems and/or combinations thereof. The present invention is applicable to systems including satellites having low-earth orbits. Additionally, it is applicable to orbits having any angle of inclination (e.g., polar, equatorial or other orbital pattern).

Figure 1:
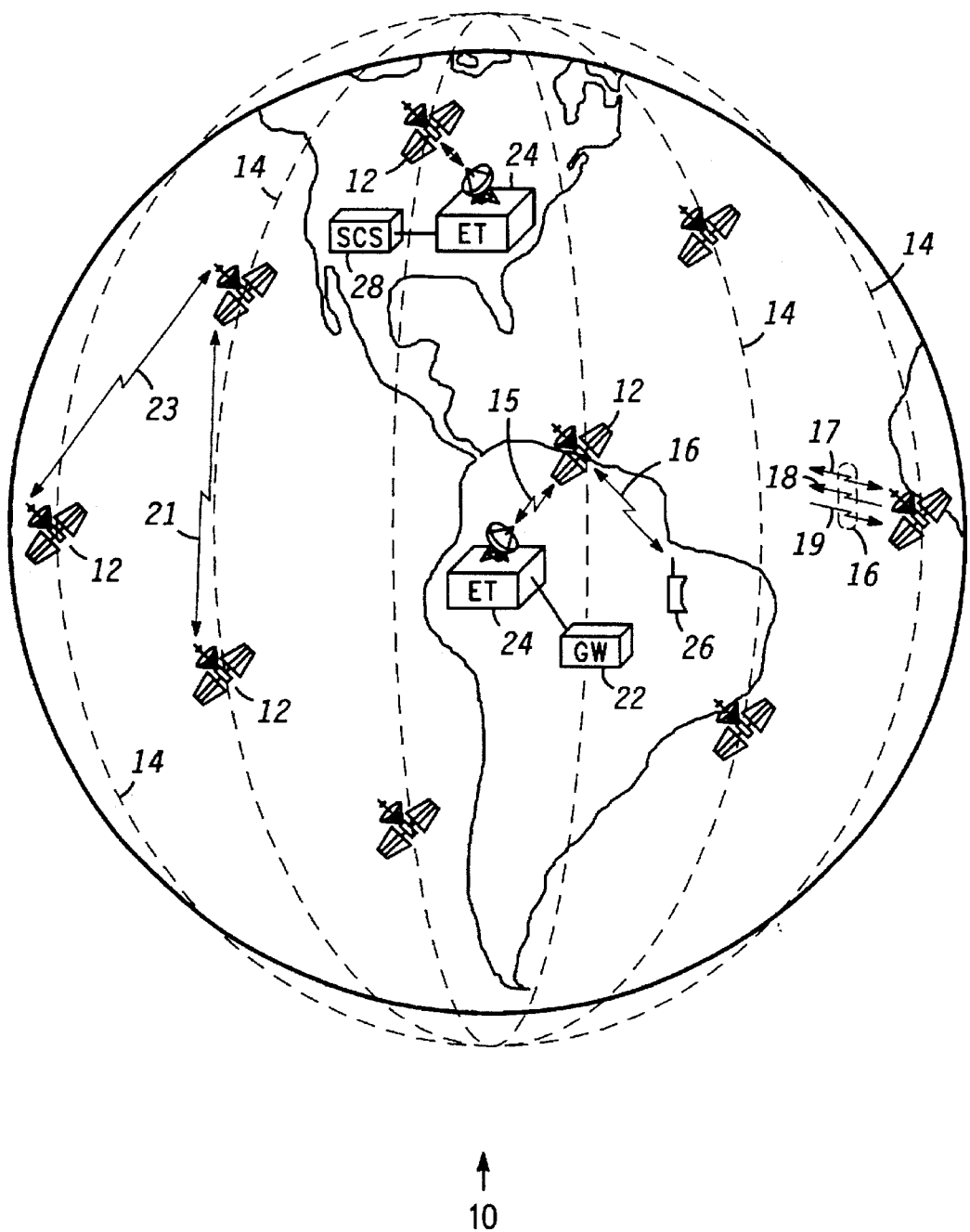
FIG. 1 illustrates a highly simplified diagram of a satellite-based communication system with which the present invention may be practiced.

FIG. 1 illustrates a highly simplified diagram of satellite-based communication system 10 with which the present invention may be practiced. Communication system 10 uses six polar orbits 14, with each orbit 14 holding eleven satellite communication stations 12 for a total of sixty-six satellites 12. However, this is not essential and more or fewer satellites, or more or fewer orbits, may be used. While the present invention is advantageously employed when a large number of satellites are being used, it is also applicable with as few as a single satellite. For clarity, FIG. 1 illustrates only a few satellite communication stations 12.

For example, each orbit 14 encircles earth at an altitude of around 780 km, although higher or lower orbital altitudes may be usefully employed. Due to the relatively low orbits of exemplary satellites 12, substantially line-of-sight electromagnetic (e.g., radio, light etc.) transmission from any one satellite or reception of signals by any one satellite involves or covers a relatively small area of earth at any instant.

For the example shown, satellites 12 travel with respect to earth at around 25,000 km/hr, allowing satellite 12 to be visible to a terrestrial station for a maximum period of approximately nine minutes. Satellite communication stations 12 communicate with terrestrial stations which may include some number of radio communication subscriber units 26 and earth terminals (ETs) 24 connected to system control segment (SCS) 28. ETs 24 may also be connected to gateways (GWs) 22, which provide access to the public switched telephone network (PSTN) or other communications facilities. Only one each of GWs 22, SCS 28 and SUs 26 are shown in FIG. 1 for clarity and ease of understanding. ETs 24 may be co-located with or separate from SCS 28 or GW 22. ETs 24 associated with SCSs 28 receive data describing tracking of satellites 12 and relay packets of control information while ETs 24 associated with GWs 22 only relay data packets (e.g., relating to calls in progress).

SUs 26 may be located anywhere on the surface of the earth or in the atmosphere above the earth. SUs 26 are preferably communications devices capable of transmitting data to and receiving data from satellites 12. By way of example, SUs 26 may be a hand-held, portable cellular telephones adapted to communicate with satellites 12. Ordinarily, SUs 26 need not perform any control functions for communication system 10.

Communication system 10 may accommodate any number, potentially in the millions, of subscriber units 26. In the preferred embodiments of the present invention, subscriber units 26 communicate with nearby satellites 12 via subscriber links 16. Links 16 encompass a limited portion of the electromagnetic spectrum that is divided into numerous channels. Links 16 are preferably combinations of L-Band frequency channels and may encompass Frequency Division Multiplex Access (FDMA) and/or Time Division Multiple Access (TDMA) communications or combination thereof. A channel is defined as at least one reoccurring time-slot of a frequency channel. As a minimum, a satellite 12 continuously transmits over one or more broadcast channels 18. Subscriber units 26 synchronize to broadcast channels 18 and monitor broadcast channels 18 to detect data messages which may be addressed to them. These data messages include both ring-alerts which notify a subscriber unit that another party desires communication, as well as pages which deliver specific messages. Subscriber units 26 may transmit messages to satellites 12 over one or more acquisition channels 19. Broadcast channels 18 and acquisition channels 19 are not dedicated to any one subscriber unit 26 but are shared by all subscriber units 26 currently within view of a satellite 12. The acquisition process is described in more detail below.

On the other hand, traffic channels 17 are two-way channels that are assigned to particular subscriber units 26 by satellites 12 from time to time. In the preferred embodiments of the present invention, a digital format is used to communicate data over channels 17–19, and traffic channels 17 support real-time communications. At least one traffic channel 17 is assigned for each call, and each traffic channel 17 has sufficient bandwidth to support, as a minimum, a two-way voice conversation. To support real-time communications, a TDMA scheme is desirably used to divide time into frames, preferably in the 60–90 millisecond range. Particular traffic channels 17 are assigned particular transmit and receive time-slots, preferably having durations in the 3–10 millisecond range, within each frame. Analog audio signals are digitized so that an entire frame's signal is transmitted or received in a single short high speed burst during an allotted time-slot. Preferably, each satellite 12 supports up to a thousand or more traffic channels 17 so that each satellite 12 can simultaneously service a like number of independent calls.

Satellites 12 communicate with other nearby satellites 12 through cross links 23. Thus, a communication from a subscriber unit 26 located at any point on or near the surface of the earth may be routed through the constellation of satellites 12 to within range of substantially any other point on the surface of the earth. A communication may be routed down to a subscriber unit 26 on or near the surface of the earth from a satellite 12 using a subscriber link 16. Alternatively, a communication may be routed down to or up from any of many ETs 24, of which FIG. 1 shows only two, through earth links 15. ETs 24 are preferably distributed over the surface of the earth in accordance with geo-political boundaries. In the preferred embodiments, each satellite 12 may communicate with up to four ETs 24 and over a thousand subscriber units 26 at any given instant.

SCS 28 monitors the health and status of system communication nodes (e.g., GWs 22, ETs 24 and satellites 12) and desirably manages operations of communication system 10. One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communications systems, such as the PSTN, may access communication system 10 through GWs 22.

With the example constellation of sixty-six satellites 12, at least one of satellites 12 is within view of each point on earth's surface at all times (i.e., full coverage of the earth's surface is obtained). Theoretically, any satellite 12 may be in direct or indirect data communication with any SU 26 or ET 24 at any time by routing data through the constellation of satellites 12. Accordingly, communication system 10 may establish a communication path for relaying data through the constellation of satellites 12 between any two SUs 26, between SCS 28 and GW 22, between any two GWs 22 or between SU 26 and GW 22.

Figure 2:
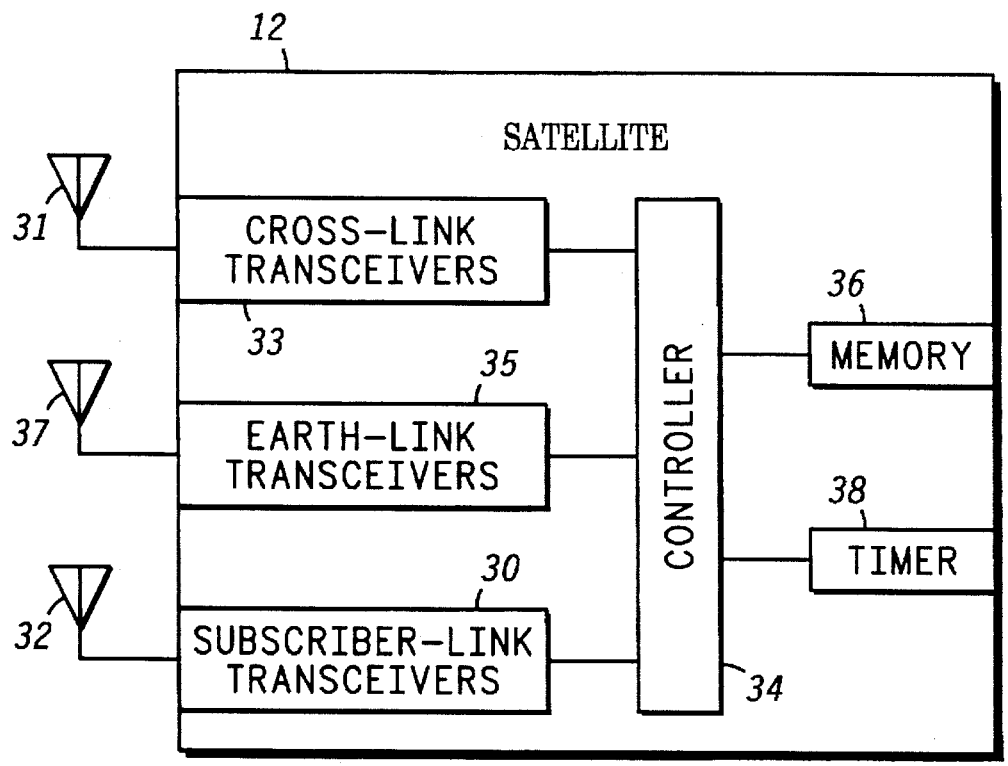
FIG. 2 illustrates a simplified block diagram of a satellite communication station suitable for use in a preferred embodiment of the present invention.

FIG. 2 illustrates a simplified block diagram of satellite communication station 12 suitable for use in a preferred embodiment of the present invention. Preferably, all satellites 12 within system 10 (see FIG. 1) include equipment as illustrated by the block diagram of FIG. 2. Satellite 12 includes cross-link transceivers 33 and associated antennas 31. Transceivers 33 and antennas 31 support cross-links to other nearby satellites 12. Earth-link transceivers 35 and associated antennas 37 support earth-links to communicate with earth terminals 24 (FIG. 1). Subscriber-link transceivers 30 and associated antennas 32 support subscriber units 26 (FIG. 1). Preferably, each satellite 12 may simultaneously support a link for up to several thousand or more of subscriber units 26 (FIG. 1). Of course, those skilled in the art will appreciate that antennas 31, 37, and 32 may be implemented either as single multi-directional antennas or as banks of discrete antennas. It is desirable that each subscriber-link antenna 32 be a phased array antenna capable of accessing many antenna beams simultaneously.

A controller 34 couples each of transceivers 33, 35, and 30 as well as to a memory 36 and a timer 38. Controller 34 may be implemented using one or more processors. Controller 34 uses timer 38 to maintain, among other things, the current date and time. Memory 36 stores data that serve as instructions to controller 34 and that, when executed by controller 34, cause satellite 12 to carry out procedures which are discussed below. In addition, memory 36 includes variables, tables, and databases that are manipulated during the operation of satellite 12.

Subscriber-link transceivers 30 are desirably multi-channel FDMA/TDMA transceivers capable of transmitting and receiving on all different selectable frequencies during particular, selectable, time-slots as directed by controller 34. Subscriber-link transceivers 30 contain multi-channel radios having a sufficient number of channels to provide the desired number of transmission and reception frequencies for signal access and control and for the user voice and/or data. Controller 34 may provide for allocation of the frequency and time-slot assignments, antenna beam-to-antenna beam hand-off and other overhead and management and control functions. Subscriber-link transceivers 30 desirably provide for transmission and reception on any frequency channel set so that each subscriber-link transceivers 30 may, if needed, utilize the entire spectral capacity of all frequency channel sets by having the capability to handle all frequency and time-slot assignments.

Figure 3:
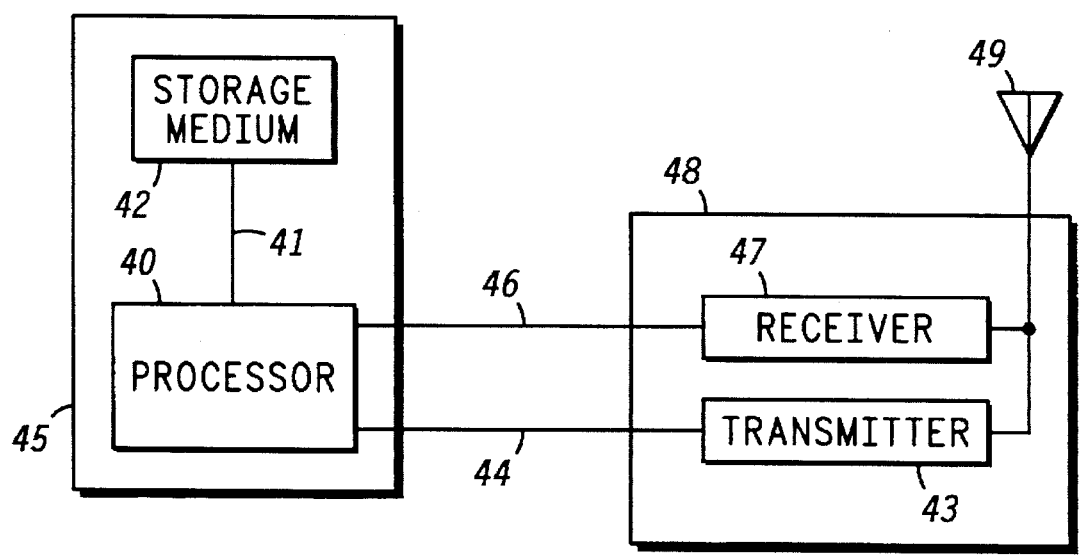
FIG. 3 illustrates a simplified block diagram of a system control station and a terrestrial station suitable for use in a preferred embodiment of the present invention.

FIG. 3 illustrates a simplified block diagram of system control station 45 and terrestrial station 48 suitable for use in a preferred embodiment of the present invention. Control station 45 and terrestrial station 48 are desirable part of SCS 28 (FIG. 1) and ET 24 (FIG. 1) respectively. Control station 45 comprises processor 40 coupled to associated storage medium 42 (e.g., random access memory or RAM, other semiconductor or magnetic read-write memory devices, optical disk, magnetic tape, floppy disk, hard disk etc.) via link 41. Terrestrial station 48 includes antenna 49 coupled to transmitter 43 and receiver 47. Transmitter 43 and receiver 47 are coupled to processor 40 via links 44 and 46, respectively. Processor 40 desirably carries out procedures exemplified below and described in the associated text. For example, in addition to performing other tasks as appropriate, processor 40 desirably stores results from such procedures in storage medium 42. Transmitter 43 and/or receiver 47 transmit messages to and/or receive messages from satellites 12.

Processor 40 generally controls and manages user access, message reception and transmission, channel setup, radio tuning, frequency and time-slot assignment, and other cellular radio communication and control functions not managed or provided for by controller 34 (FIG. 2). Among other things, processor 40 and/or controller 34 (FIG. 2) desirably executes procedures to allow user access to communication system 10. This may include protocol procedures for channel setup and other associated functions as discussed below.

Figure 4:
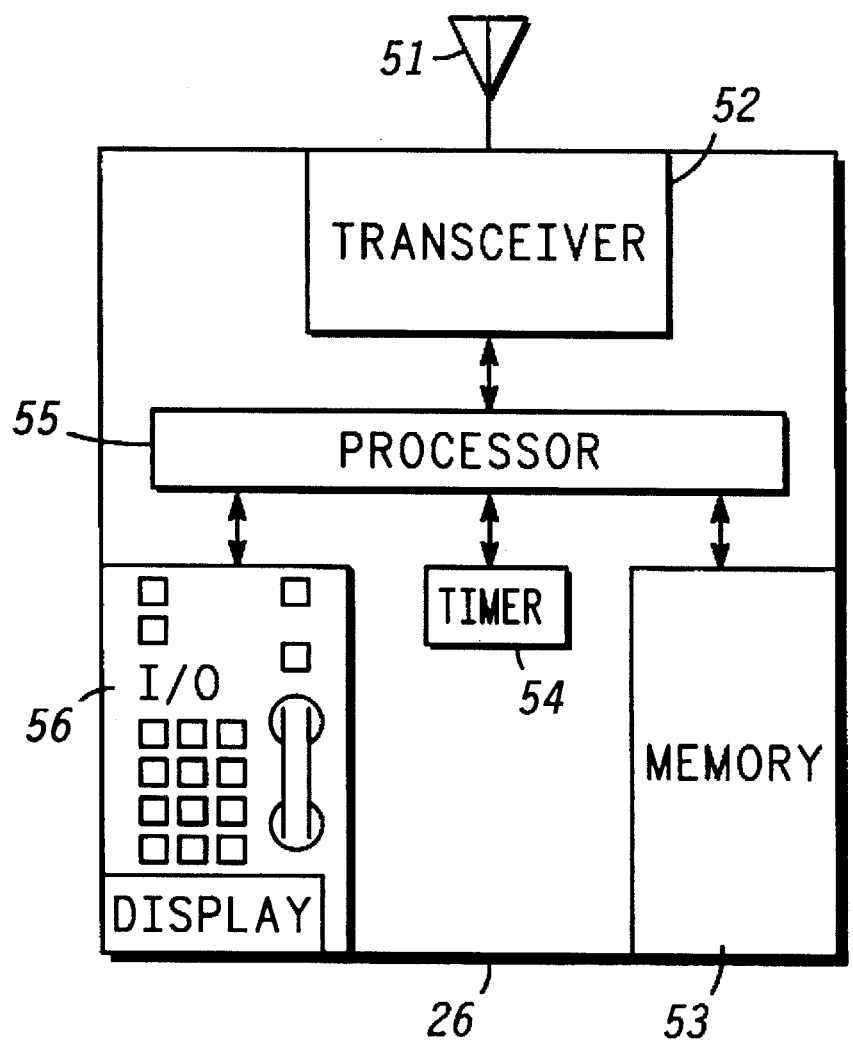
FIG. 4 illustrates a simplified block diagram of a typical subscriber unit suitable for use in a preferred embodiment of the present invention.

FIG. 4 shows a simplified block diagram of a typical subscriber unit 26 suitable for use in a preferred embodiment of the present invention. Subscriber unit 26 is analogous to subscriber unit 26 of FIG. 1 which communicates with communication system 10. SU 26 may also communicate through communication system 10 to other SUs 26 or another telecommunication device. Subscriber unit 26 includes transceiver 52 which transmits and receives signals to and from communication system 10 using antenna 51. Transceiver 52 is desirably a multi-channel transceiver capable of transmitting and receiving on all frequency channels in specified time-slots as required by communication system 10.

Transceiver 52 desirably comprises an acquisition channel transceiver portion, a broadcast channel receiver portion and a traffic channel transceiver portion. The acquisition channel transceiver portion communicates on one of several acquisition channels as determined by satellite 12 and is primarily used during access protocols when a subscriber desires access to communication system 10 as previously discussed. The traffic channel transceiver portion communicates with communication system 10 on a traffic channel assigned by satellite 12. Those of skill in the art will understand that the acquisition channel transceiver portion, the broadcast channel receiver portion and the traffic channel transceiver portion may be contained in one unit capable of all three functions. Transceiver 52 couples to a processor 55, which controls the frequency and timing parameters upon which transceiver 52 operates. In addition, processor 55 preferably controls the power level at which transceiver 52 transmits signals. Additionally, processor 55 desirably couples to input/output (I/O) section 56, timer 54, and memory 53. Processor 55 uses timer 54 to maintain the current date and time. Memory 53 includes semiconductor, magnetic, and other storage devices for storing data which serve as instructions to processor 55 and which, when executed by processor 55, cause subscriber unit 26 to carry out procedures which are discussed below. In addition, memory 53 includes variables, tables, and databases that are manipulated due to the operation of subscriber unit 26.

Input/output (I/O) section 56 of subscriber unit 26 is used to collect inputs from a user of subscriber unit 26 and to provide outputs for the user to perceive. I/O section 56 desirably includes, for example, a keypad to collect numbers that identify a party to whom a call may be directed, a power switch to control the energization and de-energization of subscriber unit 26, a send key to indicate when a called party's number has been entered, and a hook switch. A display may desirably be used to present visual information to the user, and an alarm or a beeper may desirably be used to provide an audible alert to the user. A handset desirably transforms audible signals into electrical signals, and vice-versa.

Conventional cellular radio units and systems are described for example in U.S. Pat. Nos. 4,783,779, 4,144,412, and 5,097,499 and satellite communication systems are described for example in U.S. Pat. Nos. 4,722,083 and 4,819,227. These patents are herewith incorporated by reference. Subscriber-link antennas 32 (FIG. 2), subscriber-link transceivers 30 (FIG. 2), SCS 28 (FIG. 1) and ET 24 (FIG. 1) perform those functions and contain equipment conventionally associated with switched terrestrial or satellite cellular communication systems, plus additional functions and equipment explained in more detail below.

For a subscriber unit to obtain service (e.g., telephony) from communication system 10 (FIG. 1), a communication link is established between satellite 12 (FIG. 1) and the subscriber unit. The process of establishing a communication link is herein referred to as the acquisition process or simply acquisition. Acquisition is necessary for registration with the communication system, call set-up procedures, answering call terminations, or for a subscriber unit to obtain service from the communication system. Among other things, during the acquisition process, frame timing alignment is achieved, the correct downlink time-slot is determined and the Doppler-shift of the received signal at the satellite is measured. The subscriber unit corrects its signal before transmission so that the signal is received at the satellite during the correct receive timing window with little or no frequency offset.

Figure 5:
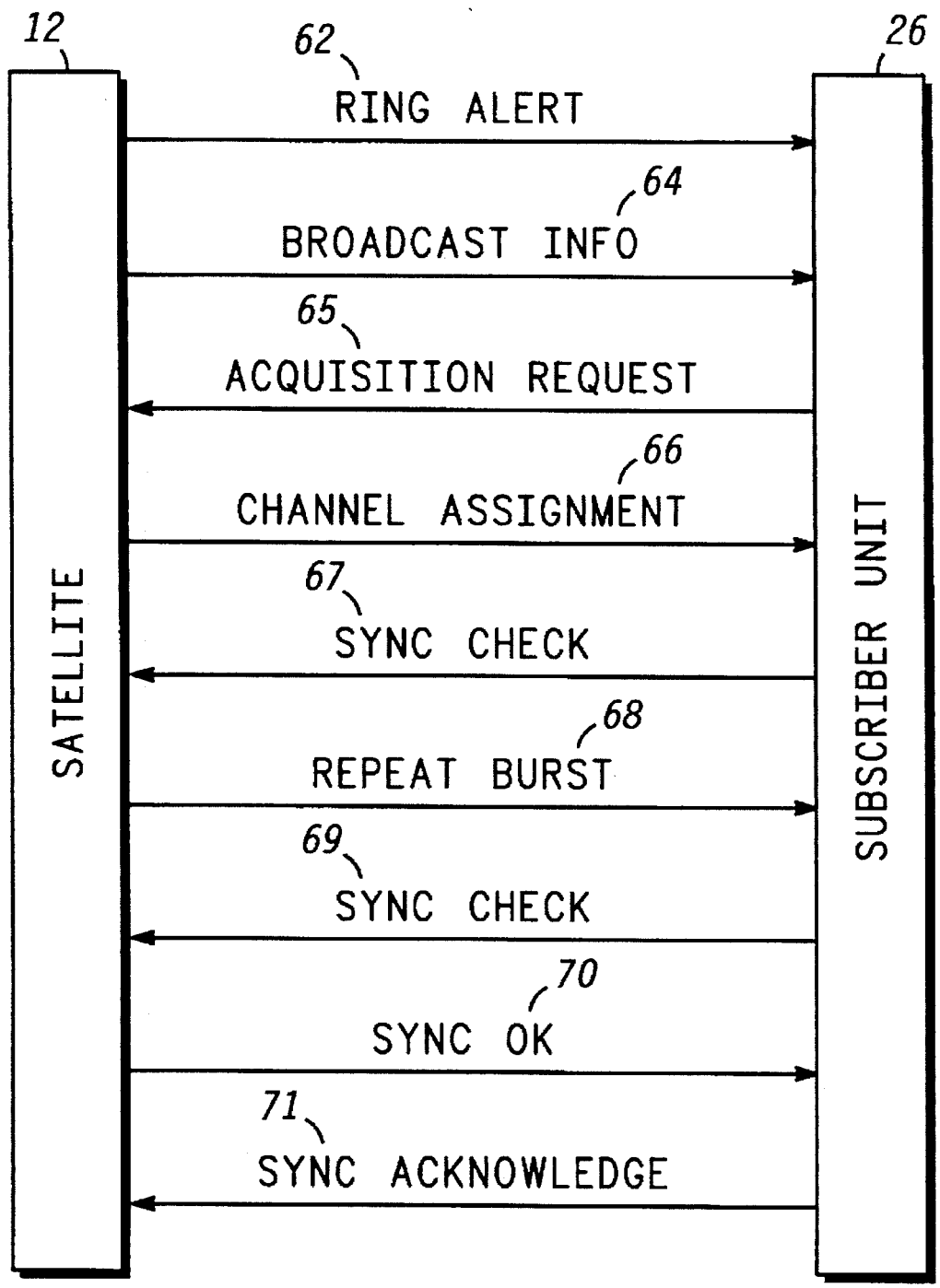
FIG. 5 illustrates a sequence of messages sent between a satellite communication station and a subscriber unit suitable for use in a preferred embodiment of the present invention.

FIG. 5 illustrates a sequence of messages sent between satellite communication station 12 and subscriber unit 26 suitable for use in a preferred embodiment of the present invention. To acquire a channel of the communication system, a subscriber unit turns on its receiver to receive a ring-alert channel. The ring-alert channel contains the frequency and time-slot of the broadcast channels for the antenna beam in which the subscriber unit is located. The subscriber unit acquires a transmission of broadcast channel 18 (FIG. 1) of the antenna beam within which the subscriber unit is located.

In a preferred embodiment of the present invention, the time and frequency of the broadcast and acquisition channels changes from time to time as the system's channel reuse pattern is modified to avoid excess co-channel interference. In addition, the broadcast channels that are available at a particular geographic location on the earth's surface change as the satellites move. Therefore, the subscriber unit must determine the correct broadcast and acquisition channels for the antenna beam in which it desires to operate at the time it desires to establish a communication link with the system.

In one embodiment of the present invention, acquisition of a broadcast channel is done by monitoring a ring-alert channel that has a frequency that is the same everywhere in the entire world. The ring-alert channel includes the broadcast time and frequency of the broadcast channel for each antenna beam. Knowing the antenna beam where the subscriber unit is located, the subscriber unit accesses the broadcast channel for its particular antenna beam. In the preferred embodiment, there are two time-slots of thirty frequency channels that comprise the broadcast channels. In one embodiment, the subscriber unit searches all thirty frequency channels in a scanner-like fashion to acquire the broadcast channel.

Referring to FIG. 5, ring alert channel information 62 and subsequently, broadcast channel information 64 is received by the subscriber unit. Once the proper broadcast channel is acquired and the signal is received, in the preferred embodiment, the subscriber unit determines if an acquisition attempt is permitted by the system. A subscriber unit may be denied acquisition as a result of insufficient network capacity, for example, when demand for services is too great.

In another embodiment, subscriber units are assigned classes. A subscriber unit may be denied acquisition when its class is being denied acquisition. One suitable process for access control is described in more detail in U.S. Pat. No. 5,490,087 entitled "RADIO CHANNEL ACCESS CONTROL" filed on Dec. 6, 1993, which is incorporated herein by reference.

If acquisition is permitted, based on the antenna beam identification in the broadcast channel, the subscriber unit initially estimates a frequency offset and timing correction for transmission of a short ranging burst which includes an acquisition request. This acquisition request 65 is transmitted by the subscriber to the satellite on acquisition channel 19 (FIG. 1). In general, the satellite receives the acquisition request and estimates the timing and frequency error. The satellite then sends a traffic channel assignment 66 including a timing correction and frequency offset to the subscriber unit. This process is described in more detail below. Those skilled in the art will recognize that the use of a short ranging burst sent by a mobile unit on a special random access channel followed by a timing correction sent from the base station has been used in terrestrial TDMA systems. Frequency correction messages however, are generally not required for terrestrial systems because of the relatively low velocity between the mobile unit and the base station.

In the preferred embodiment, after the transmission of the acquisition request, the subscriber unit waits for an acknowledgment of its request on the broadcast channel. The acknowledgment is receipt of a traffic channel assignment along with frequency offset and timing correction. If no acknowledgment is received by the subscriber unit, the subscriber unit repeats the acquisition request at random intervals and preferably on a randomly chosen acquisition channel.

When a traffic channel assignment is received, the subscriber unit transitions to the new channel's frequency and time-slot and acknowledges the transition by sending a synchronization burst ("Sync Check" 67) to the satellite. Preferably, the sync check is a short pulse transmitted on the traffic channel. The satellite measures the timing and frequency of the sync check relative to the assigned traffic channel and returns a "Downlink Sync" message, show as either 68 or 70. The Downlink Sync message preferably includes a sync status data item which informs the subscriber unit if the sync check was within tolerance for traffic channel operation along with time and frequency correction data. If the sync check signal was not within tolerance, the subscriber unit adjusts its timing and frequency and retransmits a sync check 69. If the sync check was within tolerance, the subscriber acknowledges the downlink sync message 71 and waits for a "switch to traffic channel mode" message from the satellite. Upon receipt of the "switch to traffic channel mode", the subscriber unit has completed the acquisition process and can communicate on the assigned traffic channel.

Figure 6:
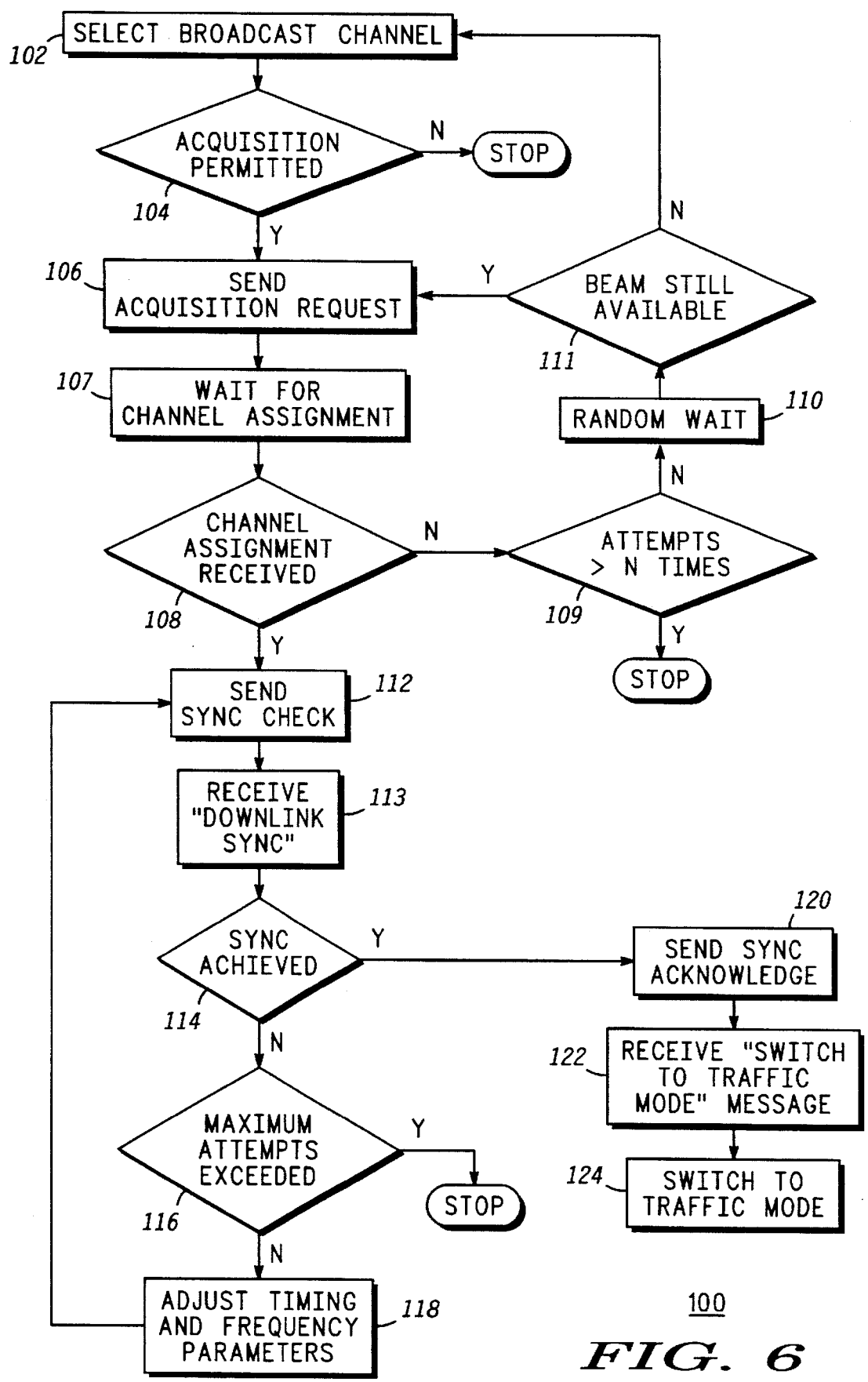
FIG. 6 shows a flow chart of a procedure performed by a subscriber unit during an acquisition process suitable for use in a preferred embodiment of the present invention.

FIG. 6 shows a flow chart of procedure 100 performed by a subscriber unit during an acquisition process suitable for use in a preferred embodiment of the present invention. Procedure 100 is performed whenever a subscriber unit desires access to communication system 10 (FIG. 1).

In task 102, the subscriber unit selects a broadcast channel. In general, a subscriber unit selects a broadcast channel when it is either initiating a call or receiving a call. When receiving a call, ring-alerts are transmitted on a ring-alert channel directed to a particular subscriber unit. Satellite communication stations continually transmit on broadcast channels 18 (FIG. 1). Preferably each antenna beam (or cell) has a broadcast channel unique to that beam and is orthogonal (i.e., non-interfering) with broadcast channels in adjacent antenna beams. Included in broadcast channel transmissions are a list of acquisition channels 19 (FIG. 1) currently being used within the antenna beam where the subscriber unit is located. Preferably included in broadcast channel transmissions are a satellite identifier, a beam identification, a list of acquisition classes permitted, and beam center location data. Also preferably included in broadcast channel transmissions are channel assignment messages when required. In the preferred embodiment, there are two broadcast channels associated with an antenna beam. The acquisition classes permitted determine classes of subscriber units for which acquisition is currently permitted.

In a preferred embodiment, the correct antenna beam for which the subscriber unit initiates acquisition is the antenna beam that is less than 500 km from the last registered location of the subscriber unit. Alternatively, the correct antenna beam is the beam having the strongest received signal power of a broadcast channel. Desirably, the subscriber unit stores the identity of all broadcast channels it detects. If no broadcast channel can be received, there is no service presently available from the system.

In task 104, the subscriber unit determines if its class is permitted acquisition attempts. If not, the subscriber unit is prohibited from requesting acquisition to the system at the present time and may try again at a later time when its class is enabled. Task 104 is preferably not executed when the reason for acquisition is the receipt of a telephone call.

In task 106, if the subscriber unit's class is permitted acquisition (enabled), the subscriber unit sends an acquisition request to the satellite communication station. The acquisition request is sent on one of the acquisition channels indicated in the broadcast channel information. The acquisition channel is desirably selected at random. In a preferred embodiment, the broadcast channel comprises downlink time-slots of a particular frame, while the acquisition channel comprises uplink time-slots of the frame of the same channel. The acquisition request preferably comprises at least one short pulse transmitted by the subscriber unit. The acquisition request preferably includes a random eight-bit subscriber unit identifier. In the preferred embodiment, the subscriber unit identifier is an eight-bit random ID selected for acquisition purposes. The timing and the frequency of the acquisition request are preferably adjusted by the subscriber unit and based on broadcast channel signal characteristics along with other broadcast channel information. Broadcast channel information desirably additionally includes information that is available to the subscriber unit such as antenna beam geometry and subscriber unit location data.

As discussed below, the satellite communication station receives the acquisition request and based on timing and frequency parameter tolerances, determines whether or not to issue a traffic channel to the subscriber unit.

In task 107, the subscriber unit waits to receive a traffic channel assignment from the satellite. Task 108 determines if a traffic channel assignment has been received within a predetermined period of time. If no traffic channel assignment is received within the predetermined period of timer task 109 is executed. Task 109 determines if the number of acquisition attempts have exceeded a predetermined number "N". If so, the subscriber unit does not send any more acquisition requests, preferably waiting until a later time. A "no service available" message or another appropriate message(s) may be displayed by the subscriber unit. If the number of acquisition attempts are below "N" attempts, task 110 is executed. In the preferred embodiment "N" is between two and ten.

In task 110, the subscriber unit waits a random amount of time so that the acquisition request of task 106 will be sent at a different time relative to the time frame of the acquisition channel. Tasks 109 and 110 perform tasks similar to that of "slotted-aloha" acquisition procedures familiar to those of skill in the art. The random wait is preferably between two and five frames. In a preferred embodiment of the present invention, the subscriber unit randomly selects another acquisition channel frequency in addition to randomly changing the time the acquisition request is sent. In the preferred embodiment, each satellite provides at least two acquisition channels in each antenna beam, and desirably three acquisition channels in each antenna beam. Randomly selecting acquisition channels and waiting a random amount of time helps to avoid collisions of acquisition requests on the acquisition channels between competing subscriber units. The time required for a subscriber unit to receive a traffic channel assignment is desirably less than seven seconds. This includes repeating the loop of tasks 106 through 111, preferably up to ten times.

It is possible that after task 110 is executed, the broadcast channel selected in task 102 is no longer present or available. Reasons for this include satellite movement, subscriber unit movement and interference scenarios. Therefore, in task 111 the subscriber unit verifies whether the broadcast channel selected in task 102 is still available. If it is not available, a broadcast channel of another antenna beam is selected in task 102. If no broadcast channel is able to be received, no service from the system is currently available.

When the subscriber unit receives a traffic channel assignment in task 108, the subscriber unit tunes to the frequency and time-slot of the assigned channel. In task 112, the subscriber unit sends a synchronization ("sync check") burst to the satellite. The "sync check" is sent on the traffic channel that has been assigned to the subscriber unit in task 108. The "sync check" is preferably a short pulse and preferably includes the random eight-bit subscriber unit ID discussed above.

When the satellite receives the "sync check", the satellite measures the timing offset and frequency offset relative to the time-slot and frequency of the assigned traffic channel. This process is discussed in more detail below. Depending on allowed tolerances, the satellite determines if synchronization is received. A "downlink sync" message is transmitted to the subscriber unit on the downlink portion of the traffic channel which includes a sync status data item indicating whether synchronization has been achieved. If the satellite sends a "sync OK" message to the subscriber unit in the "downlink sync", this indicates that synchronization has been achieved. If the satellite sends a "repeat burst" message to the subscriber unit in the "downlink sync", this indicates that synchronization has not been achieved.

In task 113, the subscriber unit receives the downlink sync message from the satellite indicating whether or not synchronization has been achieved. If the subscriber unit does not receive the "downlink sync" within a time-out period (preferably around 78 milliseconds), the subscriber unit re-transmits a sync check in task 112. In the preferred embodiment, a subscriber unit is allowed an addition three attempts to achieve synchronization.

Task 114 determines if synchronization was received. When the "downlink sync" indicates that synchronization was not achieved .(i.e., receipt of a "repeat burst" message"), task 116 is executed. When the "downlink sync" indicates that synchronization is achieved (i.e., a "sync OK" message), task 120 is executed.

When a "repeat burst" message is received in the downlink sync of task 113, the subscriber unit also receives timing offset and frequency offset parameters based on the synchronization burst sent in task 112. Task 116 determines if a maximum number of synchronization attempts have been exceeded, and if the subscriber unit gives up the synchronization procedure. In the preferred embodiment, the maximum number of acquisition attempts is between three and six. Preferably, the loop comprising tasks 112, 113, 114, 116 and 118 requires less than a few seconds to achieve synchronization. In a preferred embodiment, each time a subscriber unit receives a "repeat burst" message from a satellite, the subscriber unit resets an internal loop counter to zero. This allows the subscriber unit an additional three to six opportunities to obtain synchronization for each "repeat burst" message from the satellite.

If the maximum number of synchronization attempts has not been exceeded, task 118 is executed. In task 118, the subscriber unit adjusts its transmission frequency and adjusts the time a synchronization pulse is sent relative to the time frame of the assigned traffic channel. The adjustments may be based on the information received in task 113. In the preferred embodiment, a subscriber unit adjusts its transmit time for a propagation delay over a range from 2.3 to 11 milliseconds to achieve uplink differential time of arrival (DTOA) requirements. With the adjusted frequency and timing, task 112 is repeated and another synchronization burst is sent to the satellite.

When the downlink sync message received from the satellite in task 114 indicates that synchronization is achieved, task 120 is executed. In task 120, the subscriber unit sends an acknowledgment of the message to the satellite, such as a "sync OK" message, for example.

In task 122, the subscriber unit waits to receive a "switch to traffic channel mode" message from the satellite. Upon receipt of the message, the subscriber unit then switches from synchronization mode to traffic mode in task 124. If the "switch to traffic channel mode" message is not received by the subscriber unit within a predetermined period of time, task 124 is still executed. At this point, the acquisition process in complete and the subscriber unit and the satellite are ready to transmit traffic data on the traffic channel.

Figure 7:
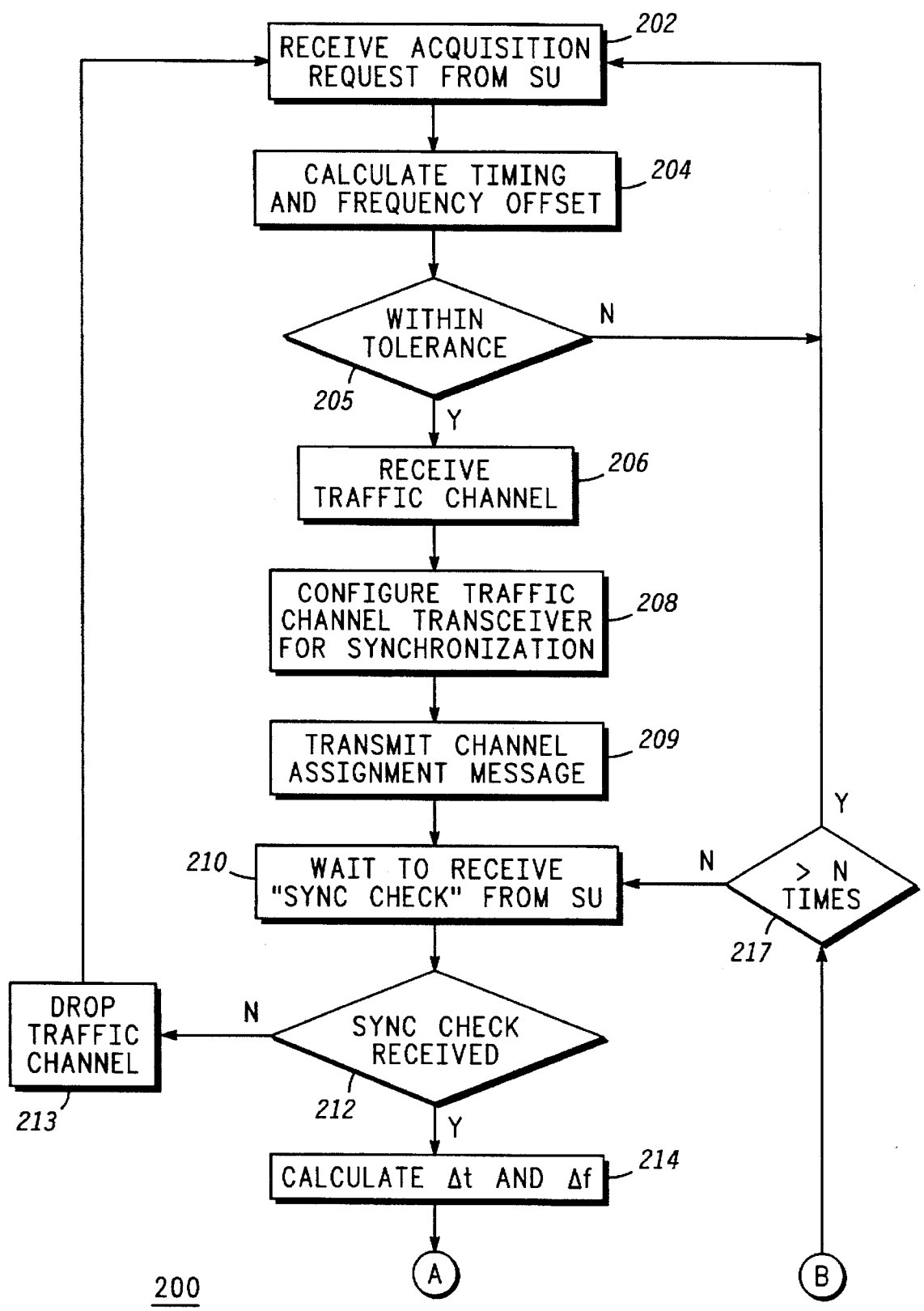
FIGS. 7 and 8 show a flow chart of a procedure performed by a satellite communication station during an acquisition process suitable for use in a preferred embodiment of the present invention.
Figure 8:
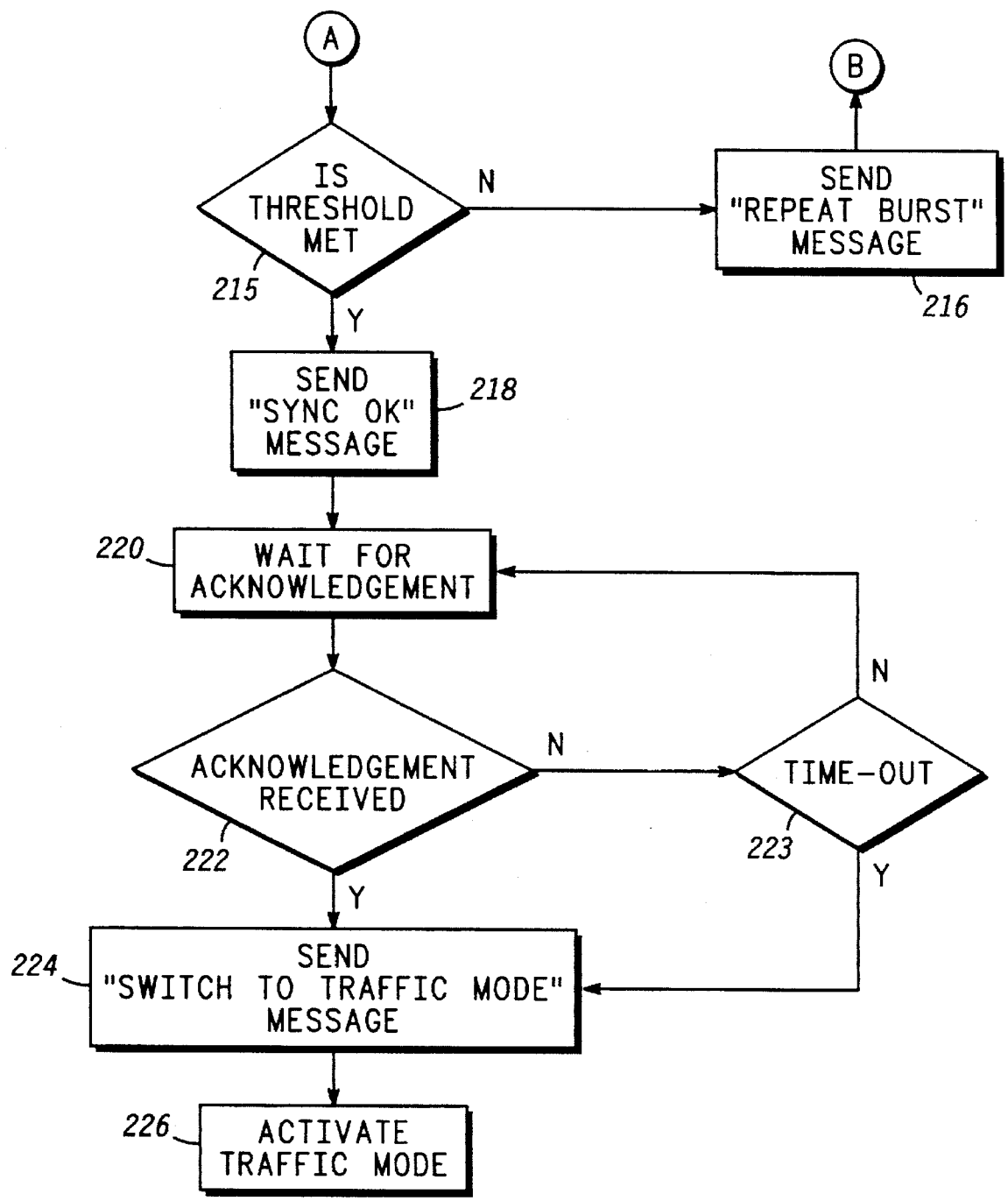

FIGS. 7 and 8 show a flow chart of procedure 200 performed by a satellite communication station during an acquisition process suitable for use in a preferred embodiment of the present invention. Procedure 200 is performed by a satellite in conjunction with procedure 100 (FIG. 6) being performed by a subscriber unit.

In task 202, the satellite receives an acquisition request from a subscriber unit over an acquisition channel. The acquisition request was sent by the subscriber unit in task 106 procedure 100 (FIG. 6). In the preferred embodiment, procedure 200 is performed simultaneously by a satellite communication station for acquisition requests received by several subscriber units.

It is possible that the satellite may not be able to decode or interpret the acquisition request because of channel fading, interference or collisions with requests of other subscriber units. If the acquisition request is not decodable, the satellite waits until it receives an acquisition request it can decode. In the preferred embodiment, a satellite receiver can decode acquisition requests with a differential time of arrival (DTOA) of up to plus or minus 2.20 milliseconds relative to an acquisition channel time-slot. Also, in the preferred embodiment, the satellite receiver can decode acquisition requests with a maximum received frequency error of plus or minus 5 kHz, plus or minus two times the downlink frequency error relative to an acquisition channel center frequency.

In task 204, the satellite calculates the timing and frequency offset of the acquisition request signal. The frequency offset is calculated by comparing the acquisition channel frequency with the frequency of the received acquisition request signal. The timing offset is calculated by measuring the time difference between when the acquisition signal was received, with the timing window of the time frame of the acquisition channel.

In task 205, the satellite determines if the timing offset and frequency offset are within a specified tolerance. If they are, task 206 is executed. If they are not, 202 is executed.

In task 206, the satellite reserves an available traffic channel for the subscriber unit. The traffic channel is analogous to traffic channel 17 (FIG. 1). The traffic channel selected for assignment to the subscriber unit should be consistent with reuse unit allocations. For example, an assigned channel should be orthogonal to traffic channels currently in use. Preferably, the traffic channel is also consistent with permitted subscriber unit loading levels supplied by SCS 28 (FIG. 1). If a traffic channel is not available, the subscriber unit is preferably sent a message that indicates that the system is busy. Alternatively, if no traffic channel is available, the satellite simply may not respond with a traffic channel assignment and the subscriber unit presumes that no service is available.

In task 208, the satellite configures its traffic channel transceiver for synchronization. For example, where quadrature phase-shift-keyed (QPSK) modulation is used in the traffic mode, the receiver portion of the transceiver would be configured for bi-phase-shift-keyed (BPSK) modulation to allow for easier synchronization.

In task 209, a traffic channel assignment message is sent to the subscriber unit. The message indicates what traffic channel has been assigned. Preferably included in this message are the timing and frequency corrections calculated in task 204. The subscriber unit receives the traffic channel assignment information in task 108 (FIG. 6). This message also desirably includes a traffic channel ID and the random eight-bit subscriber unit ID. In the preferred embodiment, this message is transmitted on the broadcast channel. The subscriber unit ID is included in the traffic channel assignment message so that all subscribers that are listening to the broadcast channel know to whom this message is directed. A logical channel number (LCN) is preferably assigned to the channel that has been reserved for the subscriber unit.

In task 210, the satellite waits a predetermined period of time to receive the "sync check" from the subscriber unit on the assigned traffic channel. The subscriber unit transits the "sync check" in task 112 (FIG. 6). In the preferred embodiment, the predetermined period of time that task 210 waits is between three and five seconds.

Task 212 determines if the "sync check" has been received within the predetermined period of time. If no "sync check" is received within the predetermined period of time (i.e., three to five seconds), task 213 drops the traffic channel assigned to that subscriber unit. Task 202 of procedure 200 is then executed where the satellite waits for another acquisition request from the subscriber unit.

When the "sync check" is received on the assigned traffic channel, in task 214, the timing offset (Δt) and frequency offset (Δf) are calculated. The timing offset (Δt) is calculated relative to the time-slot of the assigned traffic channel, and the frequency offset is calculated relative to the center frequency of the assigned traffic channel.

Task 215 determines if a timing and frequency threshold are met. If the timing and frequency thresholds are met, Synchronization is achieved. In the preferred embodiment, a traffic channel has a frequency tolerance of 600 Hz and a timing tolerance of 60 microseconds. However for the purpose of task 215, the decision threshold for the frequency offset is preferably around 350 Hz, and the decision threshold for the timing offset is preferably around 30 microseconds. Tighter decision thresholds help assure that random measurement errors do not cause false synchronization indications which could result in prematurely transitioning into traffic channel operation and create excess system interference.

If the frequency and timing thresholds have not been met, in task 216 the satellite sends a "downlink sync" to the subscriber unit that includes a "repeat burst" message. Preferably included along with this message are the timing and frequency offsets so the subscriber unit can correct its synchronization burst ("sync check"). In the preferred embodiment, the "repeat burst" message is sent to the subscriber unit on the broadcast channel.

In task 217, the satellite determines if the loop including task 216 (the sync correction loop) has been repeated more than a predetermined number of times. In the preferred embodiment, the number of time the sync correction loop can be repeated is six. After task 217 is executed, the satellite waits to receive another synchronization burst in task 212.

If the frequency and timing thresholds have been met, in task 218 the satellite sends a "downlink sync" that includes a "sync OK" message to the subscriber unit. The subscriber unit receives this message in task 113 (FIG. 6).

In task 220, the satellite waits to receive an acknowledgment from the subscriber unit that the subscriber unit has received the "synchronization achieved" message. In a preferred embodiment, the satellite waits for up to approximately three to five seconds. Task 222 determines if an acknowledgment is received from the subscriber unit within the predetermined time period. If no acknowledgment is received, task 223 determines if a specified time (i.e., a time out) has passed. When an acknowledgment is received from the subscriber unit or when the specified time of task 223 has passed, task 224 is executed. In task 224, the satellite sends a "switch to traffic mode" message to the subscriber unit. Note that it is possible for task 224 to be executed whether or not an acknowledgment has been received in task 222. However, it is presumed that the subscriber unit received a "sync OK" message from task 218 and will switch to traffic mode in task 124 (FIG. 6).

In task 226, the satellite switches its transceivers on the assigned traffic channel from the synchronization mode to a traffic mode. For example, in the preferred embodiment where BPSK modulation is used in the synchronization mode, the transceivers would be configured for QPSK modulation to allow for better data transmission.

Upon completion of procedure 100 (FIG. 6) by a subscriber unit and procedure 200 (FIGS. 7 and 8) by a satellite communication station, the subscriber unit and the satellite communication station can communicate on the assigned traffic channel. Proper frame timing alignment has been achieved, and the subscriber's transmit frequency has been adjusted for the Doppler-shift associated with the satellite movement. Interference with adjacent time-slots of the same frequency channel and with different frequency channels is prevented.

In one embodiment of the present invention, during the course of a communication, a satellite regularly transmits timing and frequency corrections to a subscriber unit so that frame timing and frequency are maintained within allowable tolerances.

As described herein, the advantages of the present invention will be apparent to those of skill in the art and provide improved methods of operating various parts of a communication system. These advantages include compensation for the propagation delay associated with the distance to a satellite and compensation for the frequency shift associated with the velocity of the satellite in a communication system where the satellites are moving rapidly with respect to the subscriber units.

Other advantages include the acquisition of a channel of a satellite communication system by synchronizing to a communication system's timing windows where the distances to the subscriber units are unknown. Another advantage is that the invention also provides a subscriber unit that sends signals in sync with the satellite's timing windows. Another advantage is that the invention also provides a subscriber unit that corrects the frequency and timing of its transmitted signals to compensate for the velocity of a satellite. Another advantage is that the invention also provides a method and apparatus of communicating with a TDMA communication system without interfering with ongoing calls in adjacent time-slots and adjacent frequency channels. Another advantage is that the invention also provides a method and apparatus that achieves proper frame timing alignment, determines the correct downlink time-slot and corrects for the Doppler-shift associated with satellite movement. Another advantage is that the method and apparatus performs these functions reliably in the presence of channel impairment such as multi-path channel fading or shadowing by obstructions. Another advantage is that the invention also provides a method and apparatus that reduces collisions on acquisition channels of a communication system. Another advantage is that the invention provides robust operation for acquisition in the presence of severe channel fading.

What is claimed is:

1. A method of synchronizing a subscriber unit with a node of a communication system, said method comprising the steps of:

receiving an assignment of a traffic channel, said traffic channel being a time division multiple access (TDMA) frequency channel;

sending a synchronization burst on said traffic channel;

receiving timing and frequency correction data based on said synchronization burst, said timing and frequency correction data calculated by said node by comparing an arrival time of said synchronization burst with a time-slot of said traffic channel, said frequency correction data calculated by comparing a frequency of said traffic channel with a frequency of said synchronization burst; and adjusting timing and frequency characteristics of said subscriber unit for communication over said traffic channel based on said timing and frequency correction data.

2. A method as claimed in claim 1 further comprising the step of communicating data with said node over said traffic channel within said time-slot and at said frequency of said traffic channel.

3. A method as claimed in claim 1 further comprising the step of sending a second synchronization burst having an adjusted transmit time and adjusted frequency in response to the adjusting step.

4. A method as claimed in claim 1 further comprising the steps of:
selecting a broadcast channel, said broadcast channel transmitting classes of subscriber units for which acquisition is prohibited;
determining if acquisition is permitted based on a class of said subscriber unit; and
sending an acquisition request to said node.

5. A method as claimed in claim 1 further comprising the steps of:
selecting a broadcast channel, said broadcast channel providing frequency and time-slot information for at least two acquisition channels;
randomly selecting one of said acquisition channels; and
sending an acquisition request to said node on said one of said acquisition channels.

6. A method as claimed in claim 1 further comprising the steps of:
receiving a downlink synchronization message from said node indicating whether synchronization has been achieved; and
switching to a traffic mode when said downlink synchronization message indicates that synchronization has been achieved.

7. A method as claimed in claim 6 wherein said traffic channel is configured for bi-phase-shift-keyed (BPSK) modulation, and wherein the switching step includes the step of switching said traffic channel to quadrature phase-shift-keyed (QPSK) modulation.

8. A method as claimed in claim 6 wherein further comprising the steps of:
sending a sync acknowledge message to said node to acknowledge receipt of said downlink synchronization message; and
receiving a traffic mode message from said node that instructs said subscriber unit to switch to a quadrature phase-shift-keyed (QPSK) modulation on said traffic channel.

9. A method as claimed in claim 1 wherein said node is a low-earth orbiting satellite that is moving rapidly with respect to said subscriber unit, and
wherein the receiving an assignment step comprises receiving an assignment of said traffic channel, said frequency of said traffic channel is affected by the satellite's movement, and said time-slot of said traffic channel is affected by a changing propagation distance to said satellite.

10. A method of synchronizing a node of a communication system with a subscriber unit, said method comprising the steps of:
receiving a synchronization burst from said subscriber unit on a TDMA traffic channel;
comparing an arrival time of said synchronization burst with a time-slot of said TDMA traffic channel to determine timing correction data;
comparing a frequency of said TDMA traffic channel with a frequency of said synchronization burst to determine frequency correction data; and
sending said timing and frequency correction data to said subscriber unit, said subscriber unit adjusting a transmit time and transmit frequency based on said correction data.

11. A method as claimed in claim 10 further comprising the steps of:
determining if a timing and frequency threshold are met; and
sending a repeat burst message to said subscriber unit when said timing and frequency threshold are not met, said repeat burst message directing said subscriber unit to resend said synchronization burst using said correction data.

12. A method as claimed in claim 10 further comprising the steps of:
determining if a timing and frequency threshold are met;
sending a sync OK message when said timing and frequency threshold have been met; and
switching from a synchronization mode to a traffic mode on said TDMA traffic channel.

13. A method as claimed in claim 12 further comprising the steps of:
waiting for an acknowledgment of said sync OK message from said subscriber unit; and
when said acknowledgment is not received within a predetermined time, sending a switch to traffic mode message to said subscriber unit.

14. A method as claimed in claim 10 further comprising the steps of:
receiving an acquisition request from said subscriber unit;
determining if said acquisition request is within a frequency and timing tolerance;
when said acquisition request is within a frequency and timing tolerance, reserving said TDMA traffic channel for said subscriber unit; and
transmitting to said subscriber unit a traffic channel assignment message which includes a frequency and time slot of said TDMA traffic channel and initial frequency and timing correction data.

15. A subscriber unit that synchronizes to a timing window of a communication station, said communication station moving with respect to earth's surface, said subscriber unit comprising:
a transmitter for sending a synchronization burst on a traffic channel to said communication station;
a receiver for receiving an assignment of said traffic channel from said communication station, said traffic channel being a time division multiple access (TDMA) frequency channel, and receiving timing and frequency correction data based on said synchronization burst; and
a processor coupled to said receiver and said transmitter for adjusting timing and frequency characteristics of said transmitter for communicating over said traffic channel based on said timing and frequency correction data.

16. A subscriber unit as claimed in claim 15 wherein said transmitter and receiver includes means for communicating data with said communication station over said traffic channel wherein said data is received by said communication station within a time-slot and at a frequency of said traffic channel.

17. A subscriber unit as claimed in claim 15 wherein said processor includes means for sending a second synchronization burst having an adjusted transmit time and adjusted frequency.

18. A subscriber unit as claimed in claim 15 wherein:

said processor includes means for selecting a broadcast channel, said broadcast channel transmitting classes of subscriber units for which acquisition is prohibited;

said processor includes means for determining if acquisition is permitted based on a class of said subscriber unit and said classes transmitted over said broadcast channel; and said transmitter includes means for sending an acquisition request to said communication station based on said class.

19. A subscriber unit as claimed in claim 15 wherein:

said processor includes means for selecting a broadcast channel, said broadcast channel providing frequency and time-slot information for at least two acquisition channels, and includes means for randomly selecting one of said acquisition channels, and wherein said transmitter includes means for sending an acquisition request to said communication station on said one of said acquisition channels.

20. A subscriber unit as claimed in claim 15 wherein:

said processor includes means for receiving a downlink synchronization message from said communication station indicating whether synchronization has been achieved; and wherein said transmitter and receiver include means for switching to a traffic mode when said downlink synchronization message indicates that synchronization has been achieved.

21. A subscriber unit as claimed in claim 20 wherein said traffic channel is configured for bi-phase-shift-keyed (BPSK) modulation, and wherein said transmitter and receiver include means for switching said traffic channel to quadrature phase-shift-keyed (QPSK) modulation.

22. A subscriber unit as claimed in claim 20 wherein:

said transmitter includes means for sending a sync acknowledge message to said communication station to acknowledge receipt of said downlink synchronization message; and said receiver includes means for receiving a switch to traffic mode message from said communication station.

23. A subscriber unit as claimed in claim 15 wherein said communication station is a low-earth orbiting satellite that is moving rapidly with respect to said subscriber unit, and wherein a frequency of said traffic channel is affected by the satellite's movement, and a time-slot is affected by a changing propagation distance to said satellite.

* * * * *